US005243735A

United States Patent [19]

O'Brien, II

[11] Patent Number: 5,243,735

[45] Date of Patent: Sep. 14, 1993

[54] REGENERATIVE FEEDBACK DOOR CONTROL DEVICE WITH ONE-WAY CLUTCH

[75] Inventor: James A. O'Brien, II, Burbank, Calif.

[73] Assignee: Thomas Industries, Inc., Los Angeles, Calif.

[21] Appl. No.: 848,302

[22] Filed: Mar. 9, 1992

[51] Int. Cl.$^5$ .......... E05F 3/00; F03G 1/00; F16H 19/04

[52] U.S. Cl. .......... 16/64; 16/49; 74/89.17; 185/39; 318/376; 318/760

[58] Field of Search .......... 185/39; 16/49, 64, 65; 318/376, 759, 760; 74/89.17

[56] References Cited

U.S. PATENT DOCUMENTS

| | | | |
|---|---|---|---|
| 581,972 | 5/1897 | Wright | 16/49 |
| 2,645,806 | 7/1953 | Turney | 16/65 |
| 3,087,720 | 4/1963 | Catlett | 268/65 |
| 3,195,879 | 7/1965 | Bond et al. | 268/33 |
| 3,237,932 | 3/1966 | Catlett | 268/65 |
| 3,247,617 | 4/1966 | Catlett | 49/107 |
| 3,425,161 | 2/1969 | Catlett et al. | 49/253 |
| 3,457,674 | 7/1969 | Catlett et al. | 49/340 |
| 3,864,875 | 2/1975 | Hewitt | 49/115 |
| 4,045,914 | 9/1977 | Catlett | 49/334 |
| 4,064,589 | 12/1977 | Bejaramo et al. | 16/53 |
| 4,136,304 | 1/1979 | Baechler et al. | 318/372 |
| 4,220,051 | 9/1980 | Catlett | 74/89.15 |
| 4,333,270 | 6/1982 | Catlett | 49/336 |
| 4,673,848 | 6/1987 | Hagiwara et al. | 318/266 |
| 4,935,677 | 6/1990 | Yoshida | 318/266 |
| 4,959,598 | 9/1990 | Yoshida et al. | 318/599 |
| 4,973,894 | 11/1990 | Johansson | 318/280 |
| 4,991,347 | 2/1991 | Takimoto et al. | 49/40 |
| 4,999,551 | 3/1991 | Yoshida et al. | 318/286 |
| 5,048,151 | 9/1991 | Orii et al. | 16/49 X |

FOREIGN PATENT DOCUMENTS

| | | | |
|---|---|---|---|
| 298231 | 1/1989 | European Pat. Off. | 16/49 |

*Primary Examiner*—Allan D. Herrmann

*Attorney, Agent, or Firm*—Hill, Steadman & Simpson

[57] ABSTRACT

A device for closing swinging doors of the type utilizing a rotating member to compress a spring during door opening to store energy in the spring to effect a closing of the door is provided with a driving connection to a d.c motor/generator effective to cause rotation of the motor during a closing movement of the door. The motor/generator acts as a generator during the closing with the generated electrical energy fed back to the motor/generator to retard rotation of the rotor, providing a brake on the closing movement of the door. The feedback circuitry includes a switch disabling or diminishing the braking during the final degrees of closing movement as well as a variable setting device allowing control of braking force.

18 Claims, 3 Drawing Sheets

REGENERATIVE FEEDBACK DOOR CONTROL DEVICE WITH ONE-WAY CLUTCH

BACKGROUND OF THE INVENTION

This invention relates to door closures and more particularly to an electromagnetically braked regenerative door closure.

Pivoted or swinging door control device are frequently used where it is desired to provide an automatic closing of the door upon passage of an entrant. Such devices are commonly found in those areas where it is generally desired that the door remain closed. One type of such control device utilizes the energy expended during the opening of the door to store energy in a compression spring and upon the absence of an opening force, utilizes that stored energy to cause a reverse pivoting or swinging of the door to its closed position. In order to moderate the closing speed, retarding systems may be utilized.

Currently well known and developed retarding systems utilize an hydraulic or pneumatic chamber to which a piston seal is connected for movement through the chamber. One-way passages allow the piston to move in one direction relatively freely during door opening while other highly constrictive controlled flow passageways retard movement of the piston in the other direction during door closing. By connecting the piston to the door control device mechanism, a controlled closing movement can be effected. An example of such a door closure mechanism is found in U.S. Pat. No. 4,064,589, the teachings of which are incorporated herein by reference.

While devices of this type adequately fulfill the function of storing opening energy and controllably releasing that energy to cause a door to close in a moderated fashion, they are relatively expensive to manufacture requiring very close tolerances to assure the long life maintenance of a seal in the hydraulic or pneumatic chamber both at the piston, and for the chamber itself to prevent leakage.

There are a number of patents which disclose automatic door operators which use a d.c. motor both as a motor and a generator to provide opening force and closing retardation when the closing is being effected by energy stored in a spring. Such patents include U.S. Pat. Nos. 3,247,617; 3,457,674; 3,425,161; 4,220,051; and 4,333,270.

Generally in those patents it is disclosed that the motor is powered so that upon the activation of a switch such as a floor mat the motor will provide an opening force to overcome the force of the return spring, as well as providing sufficient force to swing the door itself opened. During closing movement the main spring provides the force for closing the door and the motor which is connected for rotation relative to the door both in the opening and closing modes, rotates and acts as a generator, generating power to be fed back into the motor to retard the closing speed. Generally it is disclosed that the closing speed is reduced even further as the door approaches the final few degrees of closing movement. Slip clutches are provided between the motor and the door to prevent burn out of the motor in the event that the door becomes blocked.

Although such devices provide a non-hydraulic, common pneumatic braking system which controls the release of the stored spring energy during the closing movement of the door, these devices do require a d.c. motor of a sufficiently large size to not only compress the return spring, but also to provide the necessary force to open the door itself. Since these door control devices have a connection to the door either directly at the pivot point of the door or very close thereto, the moment arm of the door from the point of connection to the outer swinging portion of the door requires a substantial additional force for providing the opening of the door.

It would, therefore, be an advance in the art to provide a non-hydraulic, non-pneumatic, relatively inexpensive braking system for controlling the release of the stored energy during the closing movement of the door wherein the braking system can be made very smail.

SUMMARY OF THE INVENTION

The present invention utilizes a regenerative electromagnetic braking to control closing movement of the door in a control device that does not provide an opening force for the door itself. This can be accomplished without the necessity of any external energy source or electrical energy storage device.

The device embodying the present invention makes use of a small d.c. motor/generator to regulate closing speed and an energy storing member, such as a spring, to store energy during the door opening cycle. As the door is manually pivoted during opening, a cam and follower connection operatively coupled to the pivot causes a longitudinal movement of a rod member to occur, compressing a spring. When opening force ceases and no force is present maintaining the door in an open position, the energy stored in the spring is transmitted to the rod to cause the rod to move in a direction opposite its direction of movement during opening. This movement is again coupled to the door pivot through the cam and follower connection causing the door to swing to a closed position. A mechanical connection in a one-way clutch mechanism between the rod and the motor/generator causes movement of the rod, during closing motion only, to create a rotation of the rotor of the motor/generator, thereby generating a magnetic electric force which is back fed to the motor/-generator to retard rotation of the rotor. Due to the mechanical coupling between the rod and the rotor, the retardation of rotor rotation operates as a brake on movement of the rod. The feedback circuit may include a variable resistor to control the amount of braking force as well as one or more switches to provide different levels of braking force during different positions of movement of the door control device.

The one-way clutch mechanism decouples the rod from the motor/generator. In another embodiment, external electric power may be applied to the motor/-generator to allow it to assist the opening of the door by providing a positive opening force through the mechanical connection to the rod. In this manner, a very minimal opening force may be required to be exerted on the door while at the same time providing a controlled force closure of the door.

DESCRIPTION OF THE PREFERRED EMBODIMENTS

Figure 1:
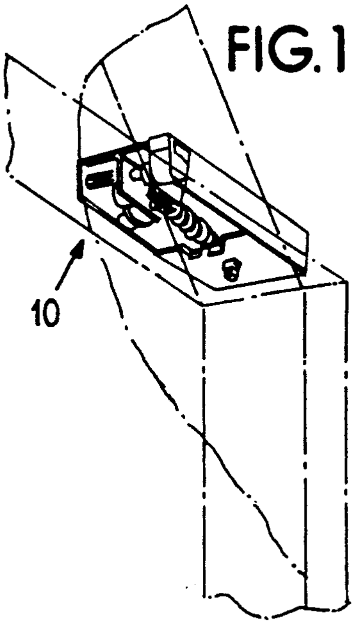
FIG. 1 is a perspective view of a door control device embodying the principles of the present invention set in place in a door jam.
Figure 6:
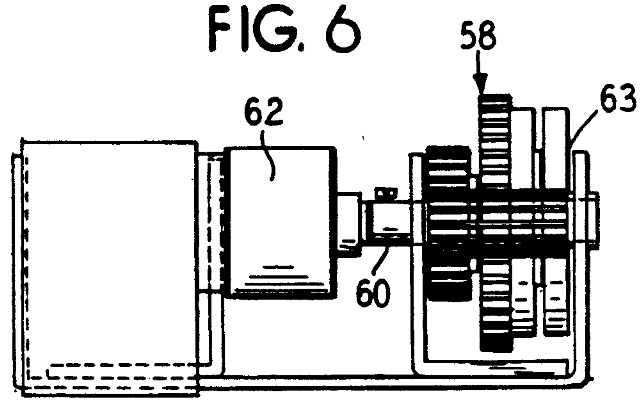
FIG. 6 is an end elevational view of the door control device of FIG. 4.
Figure 7:
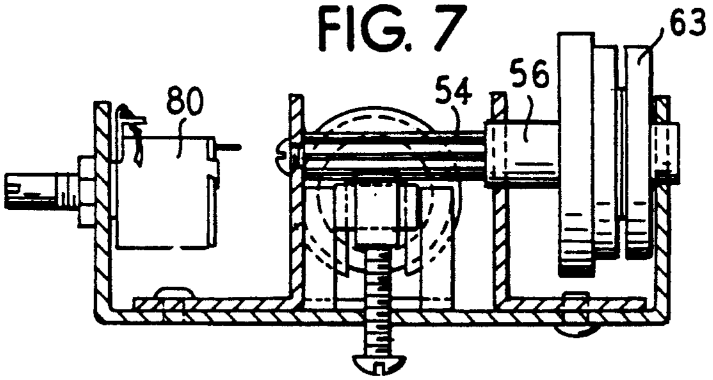
FIG. 7 is a sectional view taken generally along the line VII—VII of FIG. 4.
Figure 8:
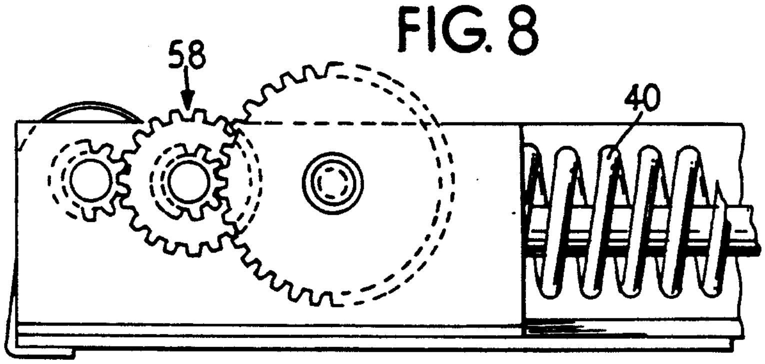
FIG. 8 is a partial side sectional view taken generally along the lines VIII—VIII of FIG. 4.

A door control device 10 embodying the principles of the present invention is shown in the figures and is comprised of a cam housing portion 12, a central spring housing portion 14 and a drive mechanism housing 16. The housing portions are formed in a single housing member 18 having an interior chamber 20.

The door control device 10 has a top wall 22 and a bottom wall 24 to further enclose interior chamber 20.

Figure 5:
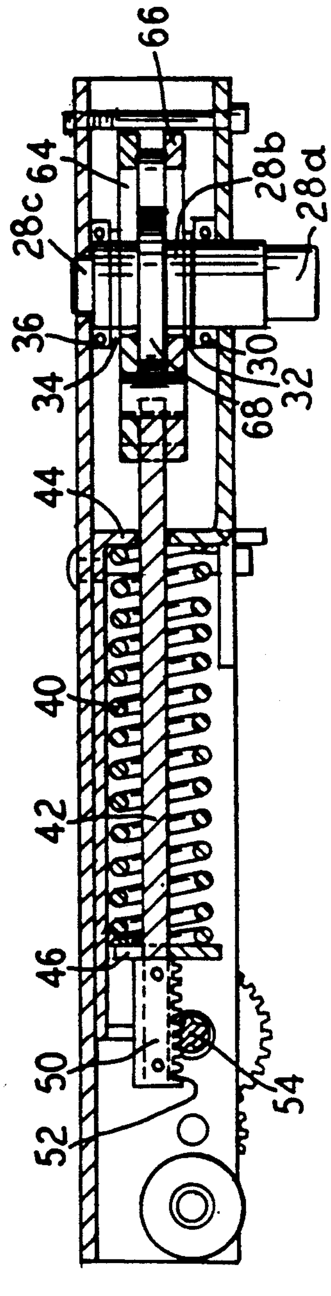
FIG. 5 is a side sectional view of the door control device taken generally along the lines V—V of FIG. 4.

The bottom wall 24 is provided with an opening 26. Extending through the opening is a spindle or door pivot member 28, this member having a non-circular end portion 28*a* for attachment to a door, such as for reception in a non-circular hole in the upper end of the door. The door spindle 28 also includes a cylindrical portion 28*b*, journaled in a ball bearing 30, a pair of shoulder or collar portions 32, 34, and an end cylindrical portion 28*c* journaled in ball bearings 36, as seen in FIG. 5.

The door control device is provided with a coil spring 40 which is disposed within the central housing about a connecting rod 42. One end of the spring bears against a wall 44 adjacent to the cam portion of the housing and the other end of the spring 40 bears against a wall 46 positioned near the gear portion of the housing.

The connecting rod 42 has a projecting portion 50 having a toothed rack 52 formed thereon which is engageable with a pinion gear 54. The pinion gear 54 is mounted on a shaft 56 which is connected through an appropriate reduction gear drive mechanism 58 to a drive shaft 60 of a dc motor/generator 62. The connection between the pinion gear shaft 56 and the gear train 58 is through a one-way clutch mechanism 63 which, as will be described in more detail below, permits the pinion gear to rotate in one direction without causing rotation of the gear train 58, but rotation of the pinion 54 in the opposite direction causes rotation of the gear train 58.

The connecting arm 42 is connected to a pair of cam plates 64, 66 which surround a cam member 68. The cam member 68 is carried on the spindle member 28 between the shoulder portions 32 and 34. The cam plates 64, 66 also carry cam bushings 70, 72 which engage a peripheral cam surface 74 of the cam member 68.

Figure 2:
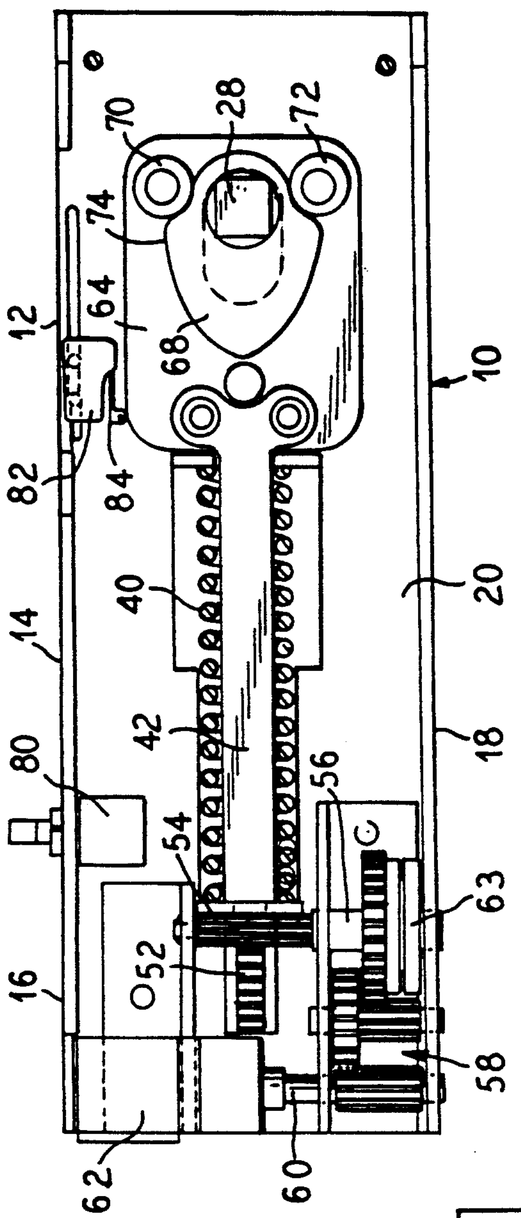
FIG. 2 is a plan view of the door control device with portions of the housing removed and shown in the door closed position.
Figure 3:
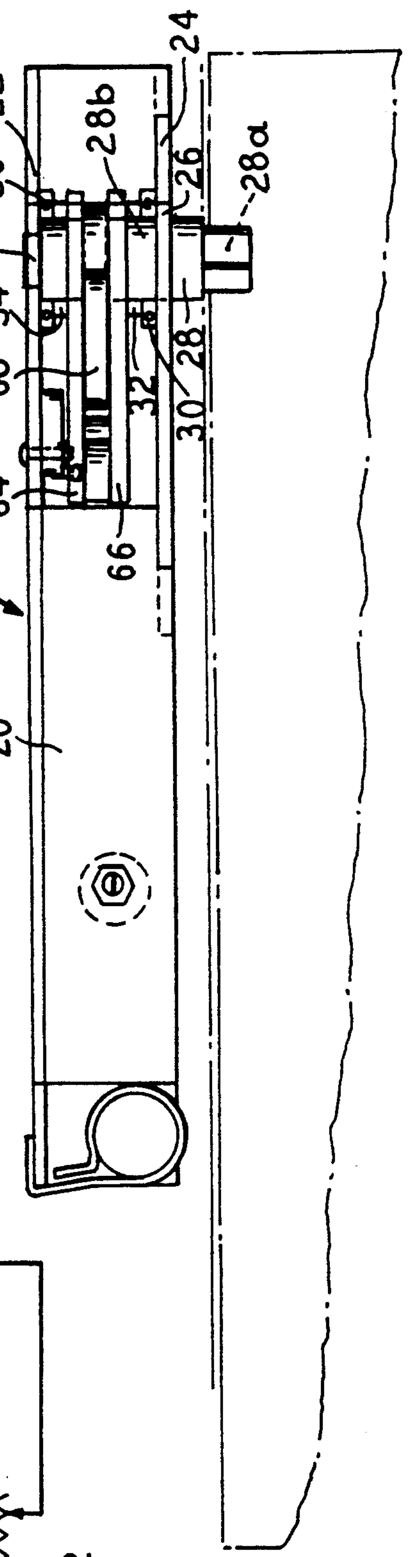
FIG. 3 is a side elevational view of the door control device of FIG. 2.
Figure 4:
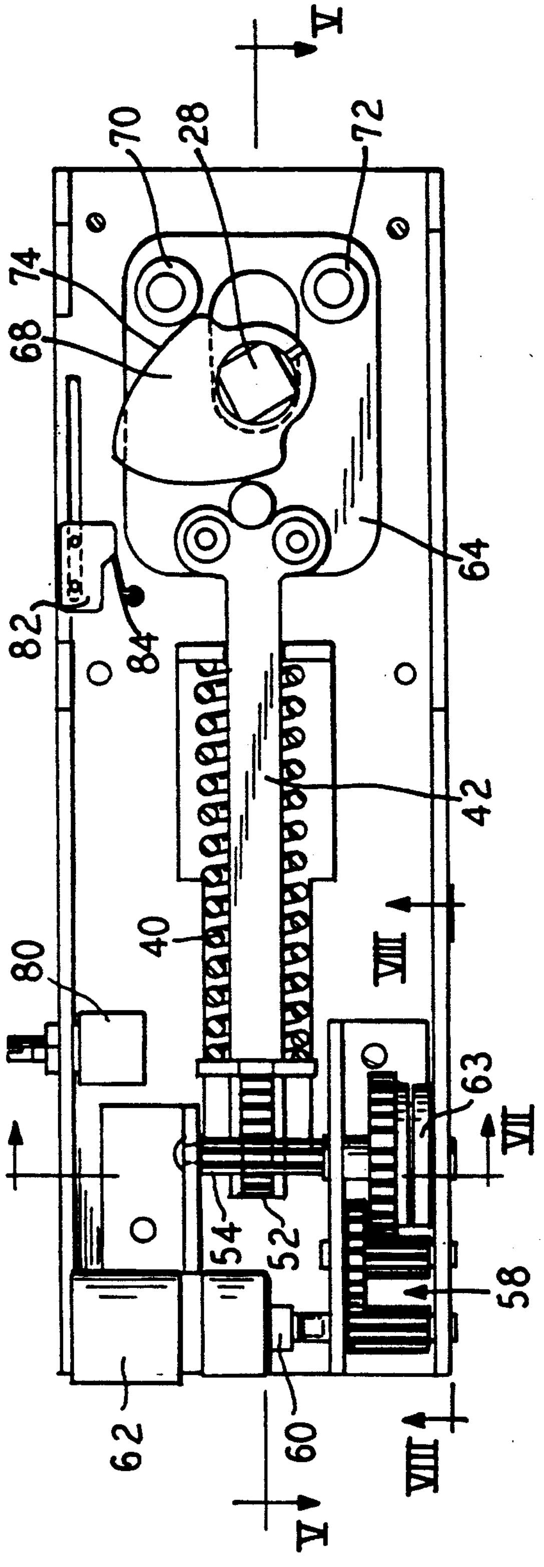
FIG. 4 is a plan view of the door control device of FIG. 2 shown in a door open position.

In use, the door control device 10 is rigidly mounted in the door frame, preferably in a concealed position in the header or overhead portion of the frame as shown in FIG. 1. Of course the closure location can, as will be apparent to those skilled in the art, be in the floor or threshold or surface mounted or otherwise located. The connection between the spindle member 28 and the door can either be directly or indirectly through a connecting arm as is well known. In the preferred embodiment illustrated the non-circular portion 28*a* of the spindle member 28 is connected to the door by inserting into a mating aperture in the upper end of the door to form one of the door pivots, which is rotated by opening and closing the door in either direction. In the camming configuration shown in FIG. 2 the doors in the fully closed position. In this orientation, recesses in the cam surface 74 of cam member 68 abut cam follower rollers 70, 72, thereby assuring proper alignment of the door in a closed position. As the door is opened (see FIG. 4), cam 68 is correspondingly rotated by a spindle member 28 and the camming surface 74 bears against follower roller 70 causing the cam plates 64, 66 to retract within the chamber in the cam portion of the housing. It should be understood that if the door were opened in a counterclockwise direction, as viewed from above in FIG. 4, the camming surface 74 would bear against following roller 72 with a similar result.

Continued opening of the door and retraction of the carrier plates causes the extension arm 42 to move axially within the housing. As this occurs, the toothed rack 52 causes pinion gear 54 to rotate. This rotation is not transmitted to the gear train 58, however, due to the one-way clutch mechanism 63.

The one-way clutch mechanism 63 may comprise one or more pawls engageable against ratchet teeth carried on a portion of said gear train. The ratchet teeth can be configured so that each pawl will slip over the teeth in one direction of rotation, but will engage and hold against said teeth in an opposite direction of rotation. Other types of one-way clutch mechanisms may also be used. What is important is that there may be minimal resistance to opening of the door and a variable resistance provided for closing of the door.

The door is easily closed by energy stored in spring 40 during the opening of the door. As this occurs, the extension arm 42 moves to a more extended position, again causing the toothed rack 52 to rotate pinion gear 54. In this direction of rotation, the one-way clutch mechanism 63 permits a transmission of rotation through the gear train to the dc motor/generator shaft 60. Rotation of the shaft 60 (which comprises the rotor) causes the motor/generator 62 to act as a generator. As shown in the circuit diagram of FIG. 9 the electrical output of the motor/generator on line 75 is fed back to the motor/generator 62 at input 76 to retard the rotation of shaft 60 and hence pinion gear 54 and ultimately spindle 28. Thus, the closure speed of the door is retarded and controlled by the dc motor/generator 62.

Figure 9:
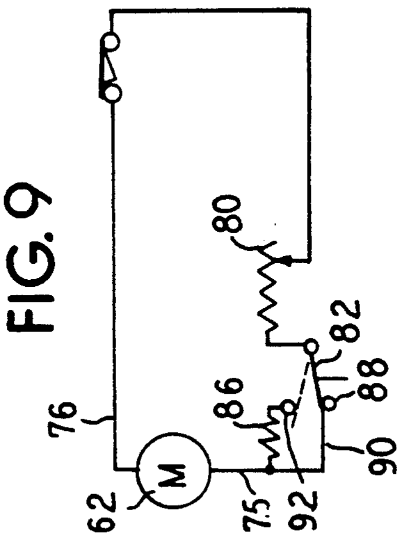
FIG. 9 is an electrical schematic diagram of the circuit in the door control device.

As shown in FIG. 9, an adjustable resistance 80 is provided so that the user can select the appropriate desired closing speed. Also, a microswitch 82 is provided which has an actuating arm 84 engageable with one of the cam plates 64, 66 to selectively bring or remove an additional resistance 86 into the circuit during a final few degrees of rotation of the spindle 28 to permit the rotational speed of the door to vary the speed to provide a positive latching of the door lock. Thus, if it is desired to have a door control device which provides an increase in the rotational speed of the door during the final few degrees of closing, the switch 82 would be of the type which is normally biased towards contact 88 so that current on line 75 bypasses resistance 86 by being diverted through line 90 until the final few degrees of opening at which point switch 82 will be moved to engage contact 92 to bring resistance 86 into the circuit thus providing additional resistance into the circuit to increase the rotational speed of the door. Alternately, if rotational speed is to decrease during the final few degrees of closing, then the switch 82 can be the type which is normally biased to contact to switch 92 such that resistance 86 will normally be in the circuit but, upon reaching the final few degrees of closing switch 82 will be operated to now engage contact 88 to allow for a bypass of resistance 86 through line 90.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A door control device for use with a pivotable door comprising:
   - a housing mounted to one of either said door and a door frame;
   - a rotatable spindle member journaled in said housing for engagement with the door to rotate when said door is pivoted;
   - a cam having a cam surface, connected for rotation with said spindle;
   - a cam plate slidable within said housing and having a portion engageable with said cam surface, rotation of said cam during door opening sliding said cam surface against said portion to slide said cam plate within said housing;
   - energy storage means operatively connected to said cam plate for receiving energy as said door is opened and for releasing energy to close said door;
   - d.c. motor/generator means having a rotor shaft;
   - selective transmission means between said spindle member and said rotor shaft for preventing transmission of rotary motion to said rotor shaft in a first rotary direction of said spindle member and for causing transmission of rotary motion to said rotor shaft in a second rotary direction of said spindle member; and
   - circuit means for connecting an electrical output of said d.c. motor/generator means to an electrical input for said motor/generator means such that electrical energy provided to said input from said output will retard rotation of said rotor shaft and spindle.

2. A door control device according to claim 1, wherein said selective transmission means comprises a one-way clutch mechanism.

3. A door control device according to claim 1, wherein said energy storage means comprises a spring.

4. A door control device according to claim 3, wherein said spring comprises a coil spring.

5. A door control device according to claim 1, wherein said selective transmission means comprises a gear rack and pinion mechanism.

6. A door control device according to claim 1, wherein said selective transmission means comprises a one-way clutch mechanism and a gear rack and pinion mechanism.

7. A door control device for use with a pivotable door comprising:
   - a rotatable spindle member for engagement with the door to rotate when said door is pivoted;
   - energy storage means operatively connected to said spindle member for receiving energy as said door is opened and for releasing energy to close said door;
   - d.c. motor/generator means having a rotor shaft;
   - selective transmission means between said spindle member and said rotor shaft for preventing transmission of rotary motion to said rotor shaft in a first rotary direction of said spindle member and for causing transmission of rotary motion to said rotor shaft in a second rotary direction of said spindle member;
   - circuit means for connecting an electrical output of said d.c. motor/generator means to an electrical input for said motor/generator means such that electrical energy provided to said input from said output will retard rotation of said rotor shaft and spindle; and
   - wherein said circuit means comprises an adjustable resistance device to adjust the amount of electrical energy being provided to said electrical input.

8. A door control device for use with a pivotable door comprising:
   - a rotatable spindle member for engagement with the door to rotate when said door is pivoted;
   - energy storage means operatively connected to said spindle member for receiving energy as said door is opened and for releasing energy to close said door;
   - d.c. motor/generator means having a rotor shaft;
   - selective transmission means between said spindle member and said rotor shaft for preventing transmission of rotary motion to said rotor shaft in a first rotary direction of said spindle member and for causing transmission of rotary motion to said rotor shaft in a second rotary direction of said spindle member;
   - circuit means for connecting an electrical output of said d.c. motor/generator means to an electrical input for said motor/generator means such that electrical energy provided to said input from said output will retard rotation of said rotor shaft and spindle; and
   - control means for actuation during the closing of the door to provide at least a two speed control for the closing of the door.

9. A door control device according to claim 8, wherein said control means comprises a switch in said circuit means engaged by moving elements in said door control device, which elements move in response to rotation of said spindle member.

10. A door control device according to claim 9, wherein said switch is mounted relative to said moving elements so as to cause a door speed increase during a final few degrees of closing movement of the door.

11. A door control device for use with a pivotable door comprising:
   - a housing;
   - a rotatable spindle member rotatably mounted to said housing for engagement with the door to rotate when said door is pivoted;
   - a cam having a cam surface, connected for rotation with said spindle member;
   - a slider means slidably held within said housing, said slider means for receiving a force from said cam surface upon rotation of said spindle and sliding with respect to said housing;
   - compressible spring means operatively connected to said slider means and said housing for receiving energy as said door is opened and for releasing energy to close said door;

dc motor/generator means having a rotor shaft;

a one-way clutch mechanism arranged between said slider means and said rotor shaft for preventing transmission of rotary motion to said rotor shaft in a first sliding direction of said slider means and for causing transmission of rotary motion to said rotor shaft in a second sliding direction of said slider means; and circuit means for connecting an electrical output of said dc motor/generator means to an electrical input for said motor/generator means such that electrical energy provided to said input from said output will retard rotation of said rotor shaft and spindle.

12. A door control device according to claim 11, wherein said spring comprises a coil spring.

13. A door control device according to claim 11, wherein said door control device further includes a gear rack and pinion mechanism between said spindle and said rotor shaft for transmitting rotary motion of said spindle member to said rotor shaft.

14. A door control device for use with a pivotable door comprising:

a rotatable spindle member for engagement with the door to rotate when said door is pivoted;

compressible spring means operatively connected to said spindle member for receiving energy as said door is opened and for releasing energy to close said door;

d.c. motor/generator means having a rotor shaft;

a one-way clutch mechanism arranged between said spindle member and said rotor shaft for preventing transmission of rotary motion to said rotor shaft in a first rotary direction of said spindle member and for causing transmission of rotary motion to said rotor shaft in a second rotary direction of said spindle member; circuit means for connecting an electrical output of said d.c. motor/generator means to an electrical input for said motor/generator means such that electrical energy provided to said input from said output will retard rotation of said rotor shaft and spindle; and wherein said circuit means comprises an adjustable resistance device to adjust the amount of electrical energy being directed to said electrical input.

15. A door control device for use with a pivotable door comprising:

a rotatable spindle member for engagement with the door to rotate when said door is pivoted;

compressible spring means operatively connected to said spindle member for receiving energy as said door is opened and for releasing energy to close said door;

d.c. motor/generator means having a rotor shaft;

a one-wag clutch mechanism arranged between said spindle member and said rotor shaft for preventing transmission of rotary motion to said rotor shaft in a first rotary direction of said spindle member and for causing transmission of rotary motion to said rotor shaft in a second rotary direction of said spindle member;

circuit means for connecting an electrical output of said d.c. motor/generator means to an electrical input for said motor/generator means such that electrical energy provided to said input from said output will retard rotation of said rotor shaft and spindle; and control means for actuation during the closing of the door to provide at least a two speed control for the closing of the door.

16. A door control device according to claim 15, wherein said control means comprises a switch in said circuit means engaged by moving elements in said door control device, which elements move in response to rotation of said spindle member.

17. A door control device according to claim 16, wherein said switch is mounted relative to said moving element so as to cause a door speed increase during a final few degrees of closing movement of the door.

18. A door control device for use with a pivotable door comprising:

a housing member;

a spindle member rotatably carried in said housing and having a portion extending beyond said housing for engagement with the door to rotate when said door is pivoted;

a cam member carried on said spindle to rotate with said spindle;

a cam plate member mounted for longitudinal movement in said housing and engageable by said cam member whereby rotational movement of said cam member effects longitudinal movement of said cam plate;

an extension arm secured to said cam plate to move therewith;

a rack gear on said extension arm;

a stationary pinion gear engageable with said rack gear whereby longitudinal movement of said rack gear results in rotational movement of said pinion gear;

a d.c. motor/generator having a rotatable rotor shaft mounted in said housing;

a gear train positioned between said pinion gear and said rotor shaft to transmit rotary motion from said pinion gear to said rotor shaft;

a one-way clutch mechanism positioned between said pinion gear and said rotor shaft to prevent transmission of rotary motion to said shaft in a first rotary direction of said pinion gear and for causing transmission of rotary motion to said rotor shaft in a second rotary direction of said pinion gear; and an electrical circuit connecting an electrical output of said motor/generator to an electrical input for said motor/generator such that electrical energy provided to said input from said output will retard rotation of said rotor shaft and spindle;

an adjustable resistance device in said circuit to adjust the amount of electrical energy transmitted from said output to said input; and a switch in said circuit means engaged by said cam plate to effect a two speed control for the closing of the door.

* * * * *